US012594943B2

(12) United States Patent
Kogure et al.

(10) Patent No.: US 12,594,943 B2
(45) Date of Patent: Apr. 7, 2026

(54) ARITHMETIC PROCESSING DEVICE, VEHICLE CONTROL DEVICE, AND UPDATE METHOD

(71) Applicant: Hitachi Astemo, Ltd., Hitachinaka (JP)

(72) Inventors: Yusuke Kogure, Ibaraki (JP); Shun Kinugasa, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 580 days.

(21) Appl. No.: 17/609,167

(22) PCT Filed: May 22, 2020

(86) PCT No.: PCT/JP2020/020237
§ 371 (c)(1),
(2) Date: Nov. 5, 2021

(87) PCT Pub. No.: WO2020/241473
PCT Pub. Date: Dec. 3, 2020

(65) Prior Publication Data
US 2022/0204008 A1 Jun. 30, 2022

(30) Foreign Application Priority Data

May 28, 2019 (JP) ................................. 2019-099015

(51) Int. Cl.
*B60W 50/04* (2006.01)
*G06F 9/30* (2018.01)
*B60W 50/00* (2006.01)

(52) U.S. Cl.
CPC ......... *B60W 50/045* (2013.01); *G06F 9/3001* (2013.01); *B60W 2050/0028* (2013.01); *B60W 2050/048* (2013.01)

(58) Field of Classification Search
None
See application file for complete search history.

(56) References Cited

U.S. PATENT DOCUMENTS 6,430,662 B1 8/2002 Hurich et al.
2004/0249558 A1* 12/2004 Meaney .............. F02D 41/2487
701/115

(Continued)

FOREIGN PATENT DOCUMENTS

CN 1288932 C * 1/2004
CN 102364891 A 2/2012

(Continued)

OTHER PUBLICATIONS

International Search Report with English translation and Written Opinion issued in corresponding application No. PCT/JP2020/020237 dated Oct. 6, 2020.

(Continued)

*Primary Examiner* — Hongye Liang
(74) *Attorney, Agent, or Firm* — Foley & Lardner LLP

(57) ABSTRACT

When a control program is updated by a device that can select and execute one of two control programs, an amount of data to be transferred is reduced to shorten time required for update of a program. A first rewritable storage unit that stores two programs, a CPU that selects and executes one of the two programs, and a second rewritable storage unit that stores common data accompanying the two programs are included.

12 Claims, 14 Drawing Sheets

(56) References Cited

U.S. PATENT DOCUMENTS

| | | | |
|---|---|---|---|
| 2010/0125700 | A1 | 5/2010 | Aida |
| 2015/0278102 | A1 | 10/2015 | Nukariya et al. |
| 2017/0212466 | A1 | 7/2017 | Nakaya |
| 2018/0267793 | A1 | 9/2018 | Watanabe |
| 2020/0310910 | A1 | 10/2020 | Saito et al. |
| 2021/0012585 | A1* | 1/2021 | Huang .................... H04L 67/12 |

FOREIGN PATENT DOCUMENTS

| | | | |
|---|---|---|---|
| DE | 44 01 891 | A1 | 7/1995 |
| DE | 19839680 | A1 | 3/2000 |
| DE | 10 2017 221 291 | A1 | 5/2018 |
| JP | 2003-114807 | A | 4/2003 |
| JP | 2007-328453 | A | 12/2007 |
| JP | 2008-077221 | A | 4/2008 |
| JP | 2015-194922 | A | 11/2015 |
| JP | 2017-133921 | A | 8/2017 |
| JP | 2018-156638 | A | 10/2018 |
| JP | 2018156638 | * | 10/2018 |
| WO | WO-2018/003649 | A1 | 1/2018 |

OTHER PUBLICATIONS

CN application No. 202080031161.0 Office Action May 21, 2024.

German Office Action issued in corresponding DE Patent Application No. 112020001909.8, dated Feb. 20, 2025 with English translation (7 pages).

Chinese Office Action issued in corresponding CN Application No. 202080031161.0, dated Sep. 23, 2024 with Machine translation (15 pages).

* cited by examiner

Figure 7:
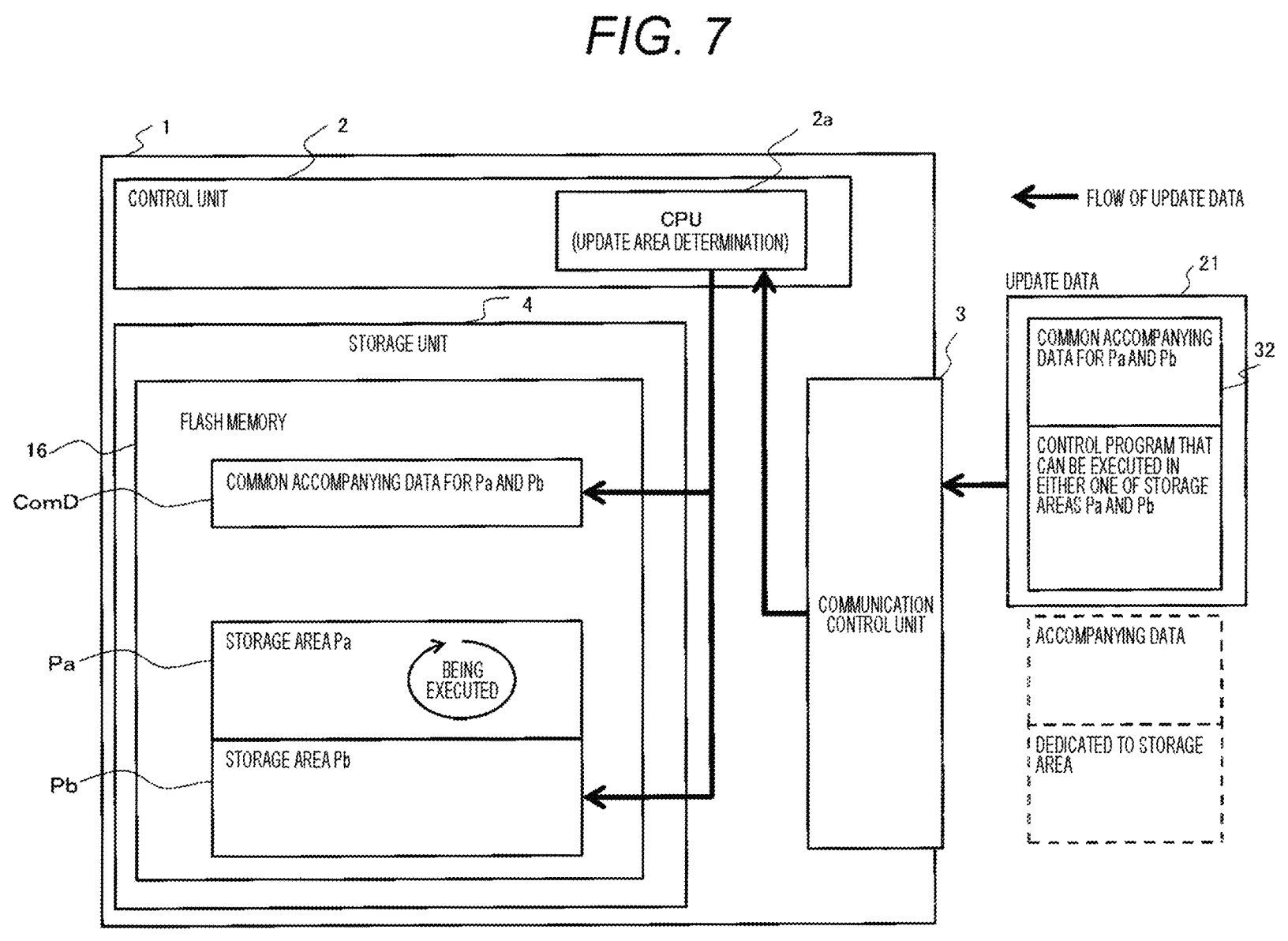

FLOW OF UPDATE DATA

21

UPDATE DATA

32

COMMON ACCOMPANYING DATA FOR Pa AND Pb

CONTROL PROGRAM THAT CAN BE EXECUTED IN EITHER ONE OF STORAGE AREAS Pa AND Pb

ACCOMPANYING DATA DEDICATED TO STORAGE AREA

1

CONTROL UNIT

2

3

COMMUNICATION CONTROL UNIT

2a

CPU (UPDATE AREA DETERMINATION)

STORAGE UNIT

4

FLASH MEMORY

16

ComD

COMMON ACCOMPANYING DATA FOR Pa AND Pb

STORAGE AREA Pa

BEING EXECUTED

STORAGE AREA Pb

Pa

Pb

1.
ERASE
(SECTOR UNIT)

2.
UPDATE AFTER
RESTORING
LOCATION ERASED
EXCESSIVELY

1.
ERASE (BIT UNIT)

2.
UPDATE CAN BE
PERFORMED IN
PINPOINT MANNER

*FIG. 11*

ARITHMETIC PROCESSING DEVICE, VEHICLE CONTROL DEVICE, AND UPDATE METHOD

TECHNICAL FIELD

The present invention relates to an arithmetic processing device and a vehicle control device.

BACKGROUND ART

In conventional reprogramming, an external device and an in-vehicle control unit (ECU) are connected, and a new control program and data accompanying the control program are written in the ECU while being transferred.

The accompanying data is information having small data size (about one byte) which is referred to by the control program and affects the execution of the control program, and can switch ON/OFF of a function realized by the control program.

A device described in PTL 1 has two program areas of an old program and a new program inside the device, and provides a technique of selecting and executing one of the two programs and transferring and writing a new program and accompanying data in the other program area.

A device described in PTL 2 is provided with a technique of storing control data in a duplicated form inside the device and performing recovery using normal control data having the same content when a failure occurs.

Further, an electrically erasable programmable read only memory (EEPROM) has been widely used as a nonvolatile memory in an in-vehicle control device. However, in the EEPROM, while stored information can be erased in units of bytes, a storage capacity is about several tens of bytes to several kilobytes. Accordingly, the EEPROM is not suitable for storing a large amount of control data. Therefore, in recent years, a flash memory having a larger capacity has started to be employed.

The flash memory is a nonvolatile memory that is electrically erasable and rewritable similarly to the EEPROM, and has a storage capacity larger than that of the EEPROM by several digits (several tens of kilobytes to several hundreds of megabytes: for example, several Mbytes).

Although the flash memory has a large capacity, at the cost of achieving high integration, erasure processing, which can be performed in byte units in the EEPROM, can be performed only in block units (sector units) of several tens of kilobytes, which leads to a drawback that it takes time to perform one time of erasure.

However, since there is also a demand for erasing or rewriting information in byte units, a technique capable of simulating the EEPROM on a flash memory has been provided.

CITATION LIST

Patent Literature

PTL 1: JP 2003-114807 A
PTL 2: JP 2008-77221 A

SUMMARY OF INVENTION

Technical Problem

However, when a control program is rewritten using an external communicating means, the conventional device transfers two control programs that can be executed in two program areas and accompanying data (Config data) each time the control program is updated. Then, since the conventional device selects a program to be updated and then performs update, there has been a problem that the update takes long time since it is necessary also to transfer a control program that is not used.

That is, the conventional technique has a configuration in which two control programs are stored in each of two banks A and B, the control program and the accompanying data are paired, and data to be received is required for two banks. This is because the control program and the accompanying data are dedicated data for each of the bank A and the bank B, and the configuration is such that data for two banks is received, and one of the banks is rewritten. Therefore, reception for two banks is required.

An object of the present invention is to reduce time required for updating a program by reducing an amount of data to be transferred when a control program is updated in a device that can select and execute one of two control programs.

Solution to Problem

The present invention includes a first rewritable storage unit that stores two programs, a CPU that selects and executes one of the two programs, and a second rewritable storage unit that stores common data accompanying the two programs.

Advantageous Effects of Invention

According to the present invention, when a program is updated, it is possible to shorten update time by reducing a transfer amount of update data without transferring two programs.

Details of at least one implementation of the subject matter disclosed herein are set forth in the accompanying drawings and description below. Other features, aspects, and effects of the disclosed subject matter will be clarified by disclosure, drawings, and claims below.

BRIEF DESCRIPTION OF DRAWINGS

FIG. 1 is a functional block diagram illustrating a conventional example and illustrating an overall configuration of a program update system including an arithmetic processing device.

FIG. 4 is a diagram illustrating the conventional example and illustrating an example of flow of data of a received update program.

FIG. 6 is a functional block diagram illustrating the first embodiment of the present invention and illustrating an overall configuration of a program update system including an arithmetic processing device.

FIG. 7 is a diagram illustrating the first embodiment of the present invention and illustrating an example of flow of data of an update program.

FIG. 11 is a functional block diagram illustrating a third embodiment of the present invention and illustrating an overall configuration of the program update system including a rollback function.

DESCRIPTION OF EMBODIMENTS

First Embodiment

Figure 2:
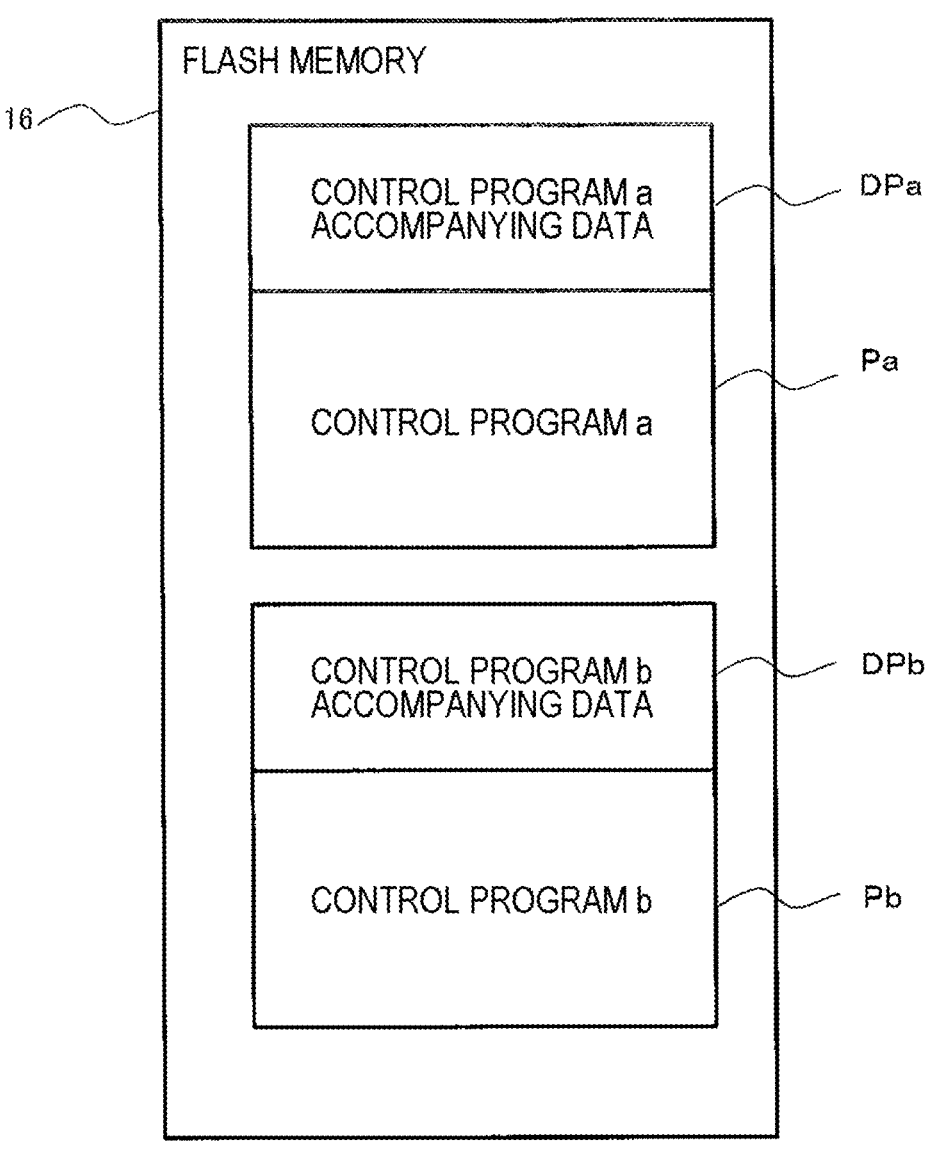
FIG. 2 is a diagram illustrating the conventional example and illustrating an example of a flash memory.

Hereinafter, an embodiment of a program update system including a vehicle control device (arithmetic processing device) will be described with reference to the drawings.

Figure 1:
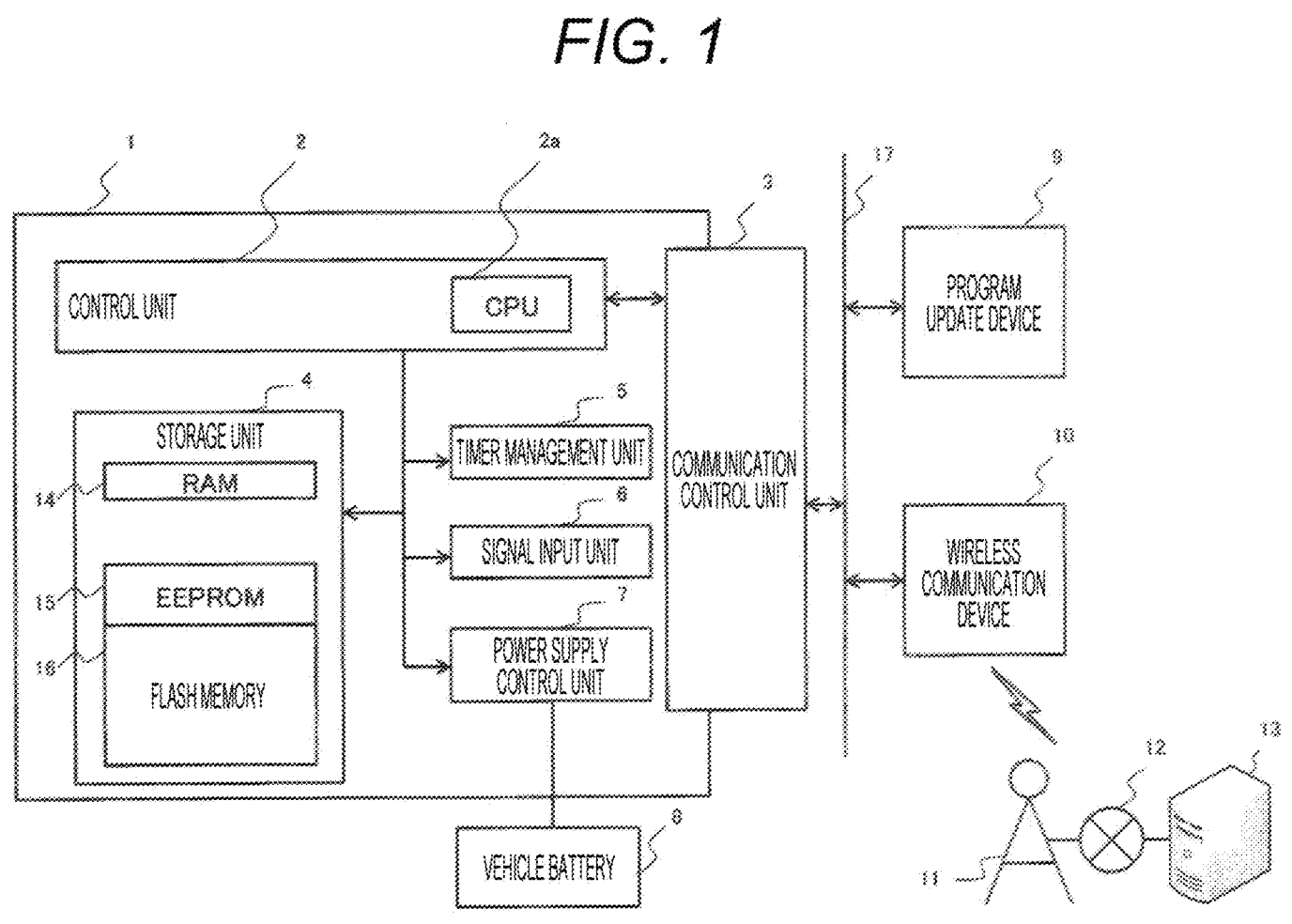

First, FIG. 1 is a functional block diagram illustrating a conventional example and illustrating an overall configuration of a program update system including an arithmetic processing device 1. The arithmetic processing device 1 includes a control unit 2, a communication control unit 3, a storage unit 4, a timer management unit 5, a signal input unit 6, and a power supply control unit 7.

The timer management unit 5 measures various types of time. The signal input unit 6 receives a signal from various sensors. The control unit 2 is mainly configured by a CPU 2a, and controls overall processing of the arithmetic processing device 1 by executing a control program stored in the storage unit 4.

The storage unit 4 includes various storage media such as a random access memory (RAM) 14, an electrically erasable programmable read only memory (EEPROM) 15, and a flash memory 16. Among them, the flash memory 16 stores in advance a control program executed by the control unit 2. The RAM (main storage) 14 temporarily stores a control program to be executed and various types of information for reading and writing.

FIG. 2 is a diagram illustrating the conventional example and illustrating an example of the flash memory 16. As illustrated in FIG. 2, the flash memory 16 has storage areas Pa and Pb, and stores different old and new control programs that can be executed by the control unit 2. Note that the two storage areas Pa and Pb can be configured by two different banks.

The control unit 2 can select and execute one of the storage areas Pa and Pb, and normally, a control program whose update timing (update date and time) is later is executed. The update date and time of the control program is set by a program update device 9 or the control unit 2.

Similarly, as illustrated in FIG. 2, the flash memory 16 has data (DPa, DPb) accompanying the control program, and stores data accompanying a control program read or written from the control programs stored in the storage areas Pa and Pb.

Note that, although each electrical block is functionally illustrated in FIG. 1, some recent integrated circuit devices have the storage unit 4 mounted inside the CPU 2a. Accordingly, the above can be applied to one integrated piece or separate pieces of hardware.

As illustrated in FIG. 1, the arithmetic processing device 1 is connected to a data center 13 via a base station 11 and a communication network (including a wireless or wired communication network) 12 through a wireless communication device 10.

Further, various electronic control units (ECUs) such as the program update device 9 and the wireless communication device 10 are connected to a vehicle communication network 17. The control unit 2 executes a program described in the flash memory 16 to communicate with various ECUs of the vehicle communication network 17 through the communication control unit 3.

The power supply control unit 7 is connected to a vehicle battery 8, converts a battery voltage, and supplies power to each block in the arithmetic processing device 1.

Figure 3:
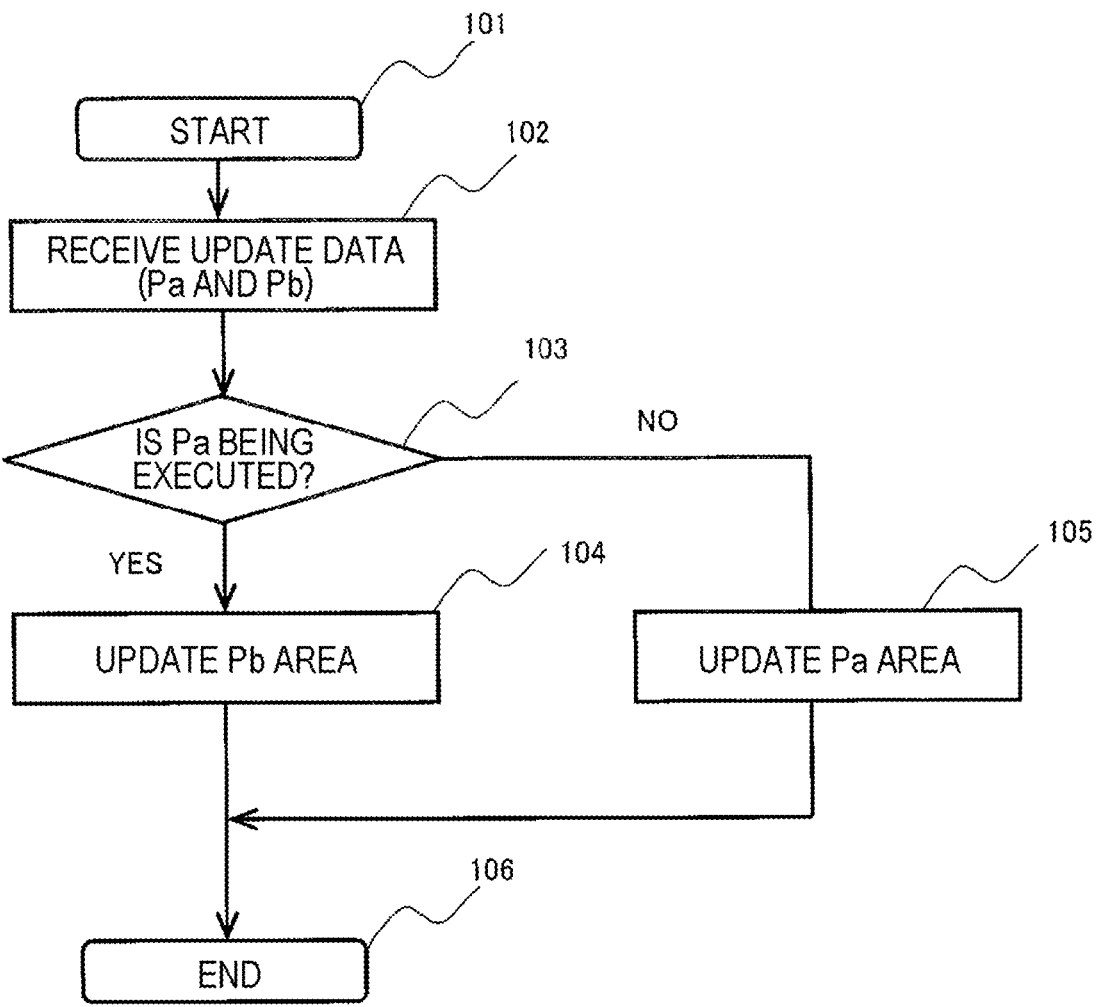
FIG. 3 is a flowchart illustrating the conventional example and illustrating an example of program update processing.

FIG. 3 is a flowchart illustrating the conventional example and illustrating entire processing at the time of program update.

Figure 4:
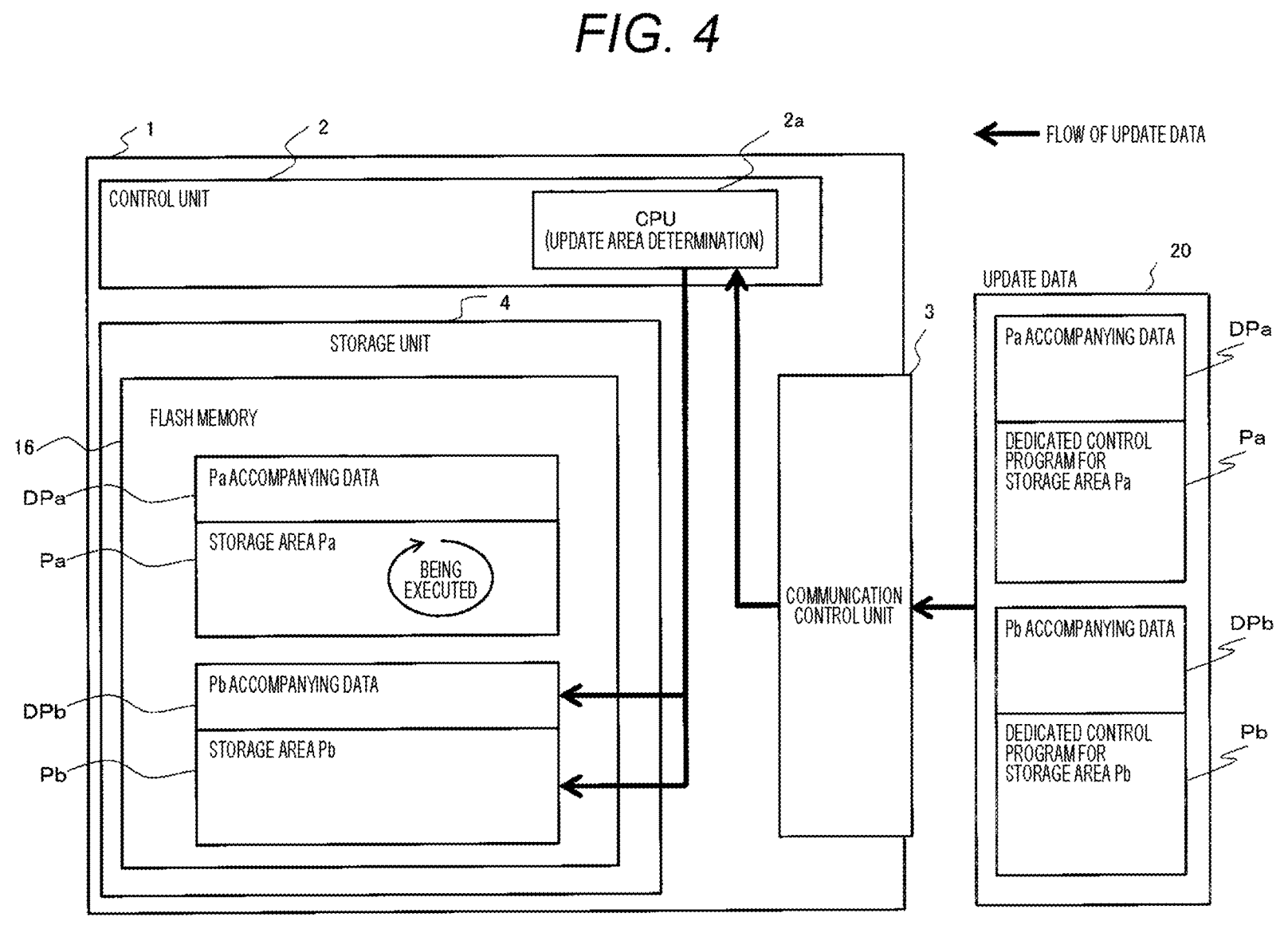

FIG. 4 is a diagram illustrating the conventional example and illustrating an example of flow of data of a received update program.

When the control program of the arithmetic processing device 1 is updated, as illustrated in FIGS. 3 and 4, update data 20 including two control programs that can be executed in each of the storage areas Pa and Pb and accompanying data is received from the program update device 9 or the wireless communication device 10 via the communication control unit 3 (102).

Note that the program update device 9 receives an update program from the wireless communication device 10 and transmits the update program to each of the arithmetic processing devices 1 at a predetermined timing. The arithmetic processing device 1 mounted on a vehicle constitutes a plurality of ECUs such as an engine ECU, a motor ECU, a brake ECU, a steering ECU, and a driving assistance ECU. The program update device 9 receives an update program of various ECUs received from the data center 13, and selects and distributes an update program for each ECU.

The control unit 2 of the arithmetic processing device 1 determines an area to be updated (103), and selects, as an update target, a control program that can be executed in a storage area that is not currently executed between the storage areas Pa and Pb. Then, there is considered a method in which the control unit 2 erases and writes data in the storage area Pa (Pb) to be updated (104, 105), and also erases and writes data accompanying the control program to be updated (storage areas DPa and DPb).

However, in the method of transferring two control programs that can be executed in each of the storage areas Pa and Pb and accompanying data each time the control program is updated, selecting a control program to be updated, and then updating the control program, it is necessary to transfer a control program that is not used, and thus it takes time to update the control program.

In view of the above, the present first embodiment solves the problem by incorporating a contrivance described below at the time of creating a program.

Figure 5:
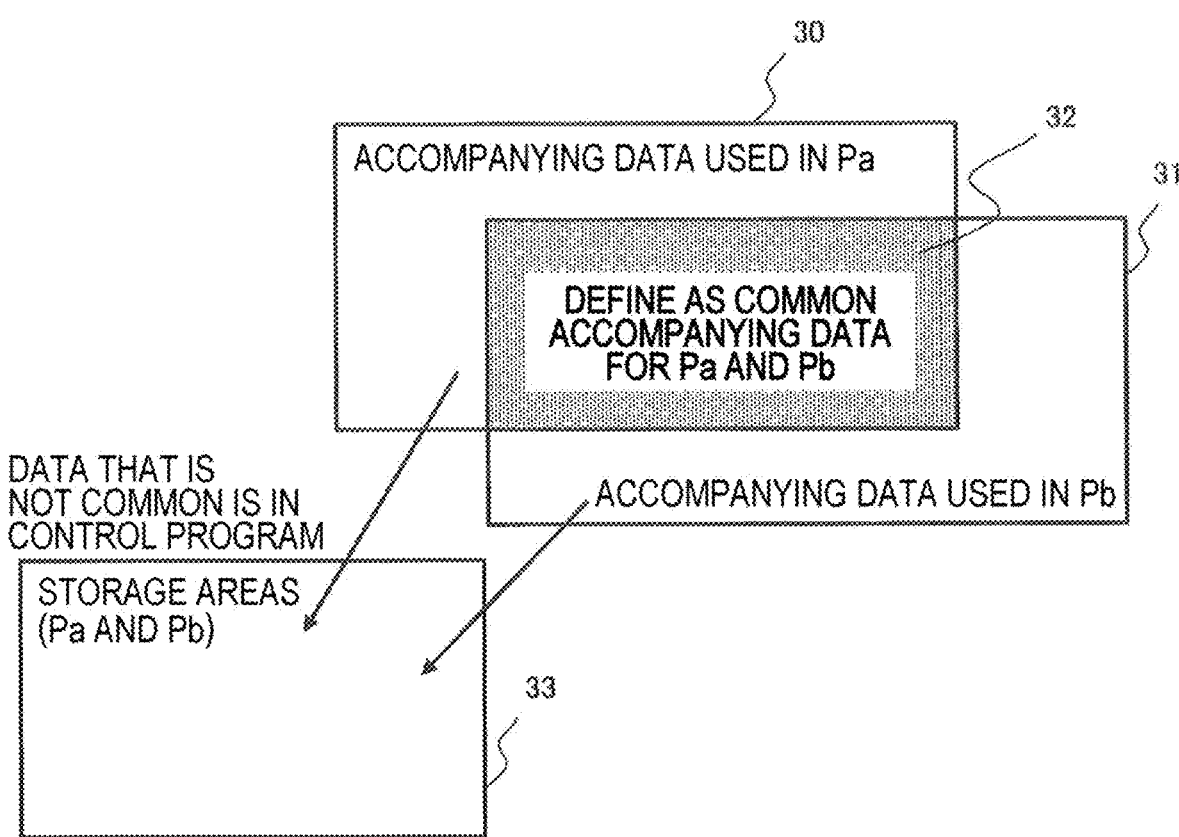
FIG. 5 is a diagram illustrating a first embodiment of the present invention and illustrating an example of a method of commonalizing data accompanying a program.
Figure 6:
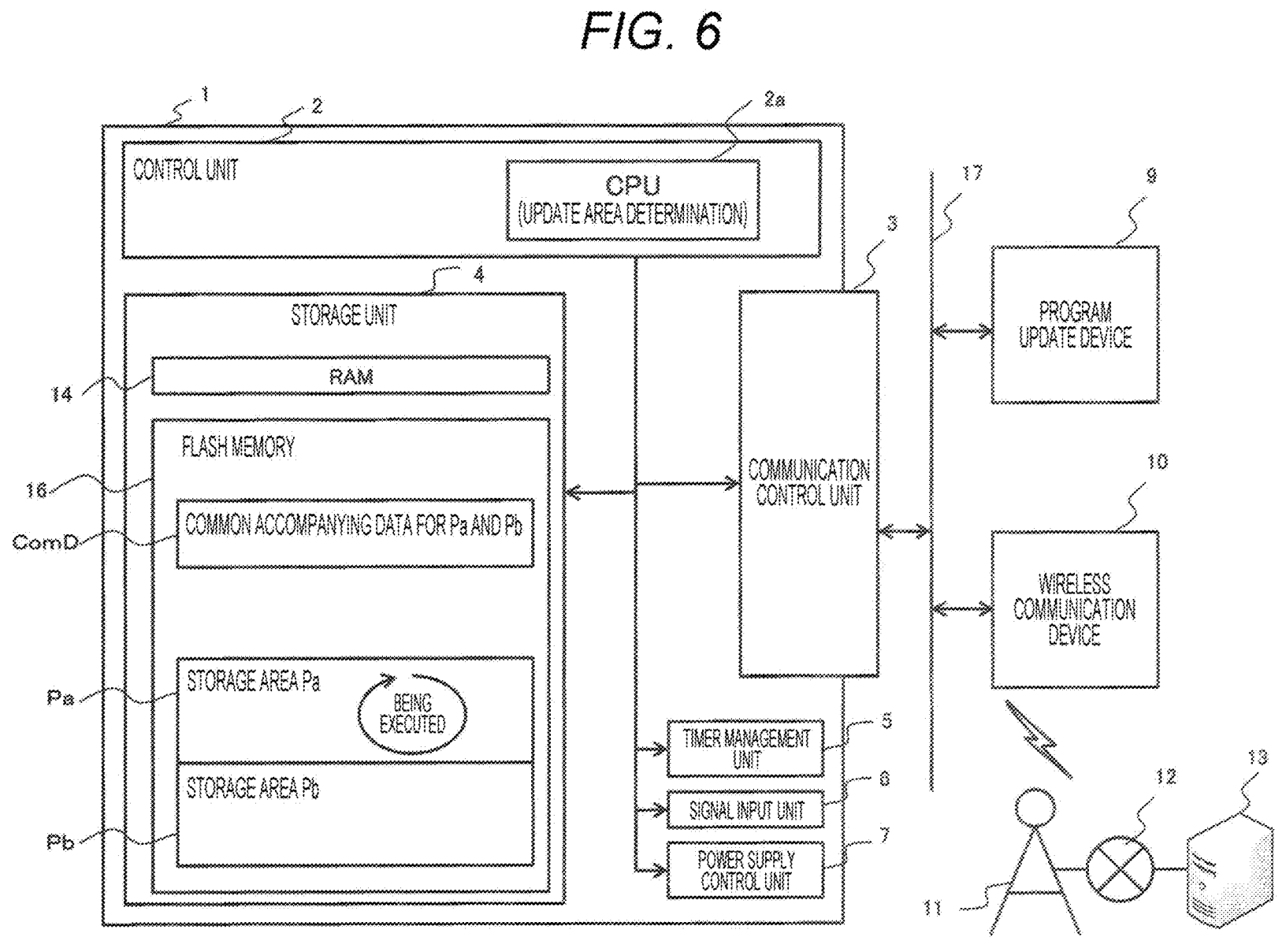

FIG. 5 is a diagram illustrating an example of a method of commonalizing data accompanying a program of the present invention. FIG. 6 is a functional block diagram illustrating an overall configuration of a program update system including the arithmetic processing device 1 of the first embodiment. FIG. 7 is a diagram illustrating an example of flow of data of an update program of the first embodiment.

FIG. 6 illustrates the arithmetic processing device 1 of the first embodiment, and is different from FIGS. 1 and 2 of the conventional example in that a common storage area ComD for storing common accompanying data (Pa and Pb common accompanying data in the diagram) 32 is set in the flash memory 16, and other configurations are similar to those of the conventional example.

In the conventional example illustrated in FIG. 2, since data accompanying a control program includes information dependent on the control program, the control program requires dedicated accompanying data.

In view of the above, as illustrated in FIG. 5, on the premise that a control program and accompanying data are updated, information (accompanying data) common to control programs is defined as the common accompanying data 32, and accompanying data that is not common is included in the control program, so that dependency between the accompanying data and the control program is eliminated.

In the above manner, as illustrated in FIG. 7, the common storage area ComD for storing the common accompanying data 32 is set in the flash memory 16, and non-common accompanying data is included in a control program (storage areas Pa and Pb), so that it is possible to create a control program that can be executed in the storage areas Pa and Pb without depending on the storage areas Pa and Pb, and, as indicated by the update data 21, it is not necessary to transfer extra information that is not used, so that it is possible to shorten the time required for the update.

Note that, in the first embodiment, the example in which the program update device 9 acquires an update program and transfers the update program to the arithmetic processing device 1 at a predetermined timing is described. However, the present invention is not limited to this configuration. The arithmetic processing device 1 may receive an update program from the wireless communication device 10.

Second Embodiment

The present embodiment reduces update time in the first embodiment.

Figure 8A:
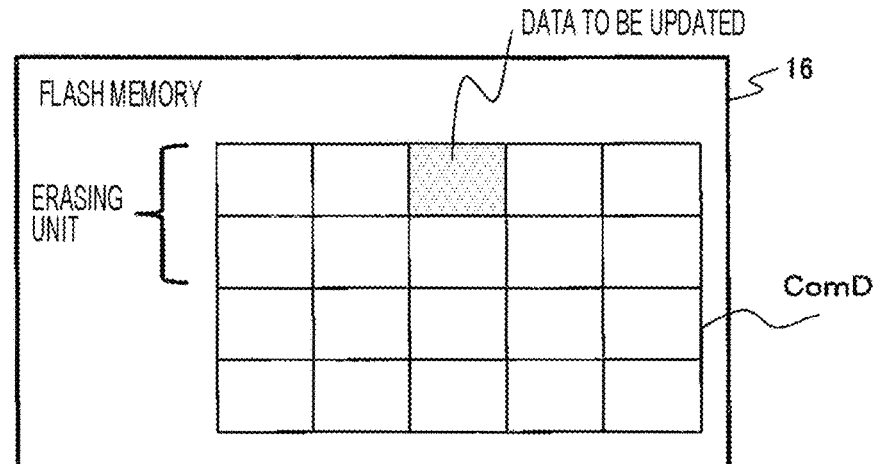
FIG. 8A is a diagram illustrating a second embodiment of the present invention and illustrating an update target in a case where common accompanying data is stored in a flash memory.
Figure 8B:
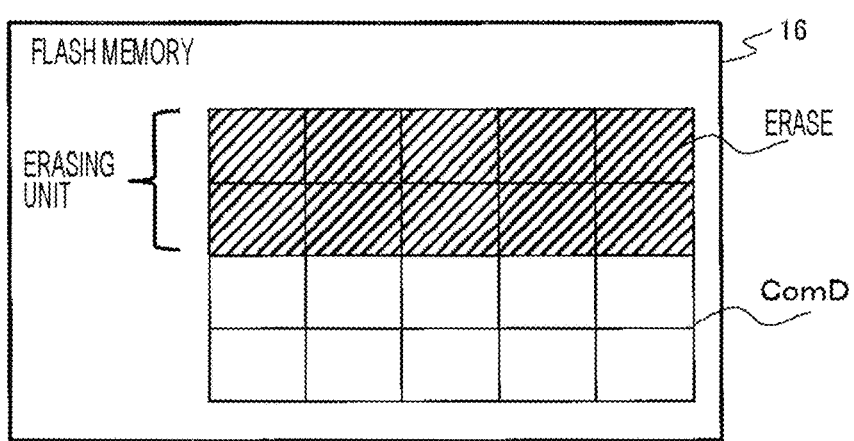
FIG. 8B is a diagram illustrating the second embodiment of the present invention and illustrating an erasing range in a case where the common accompanying data is stored in the flash memory.
Figure 8C:
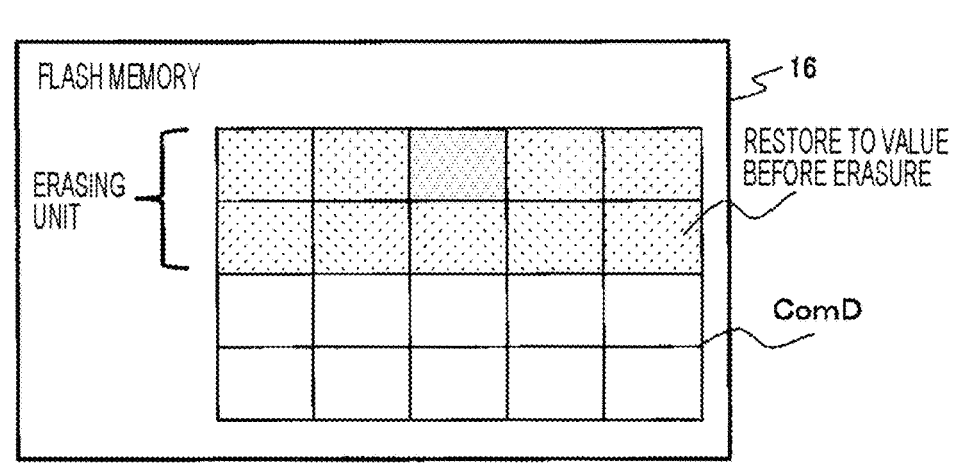
FIG. 8C is a diagram illustrating the second embodiment of the present invention and illustrating a state after update in a case where the common accompanying data is stored in the flash memory.
Figure 9A:
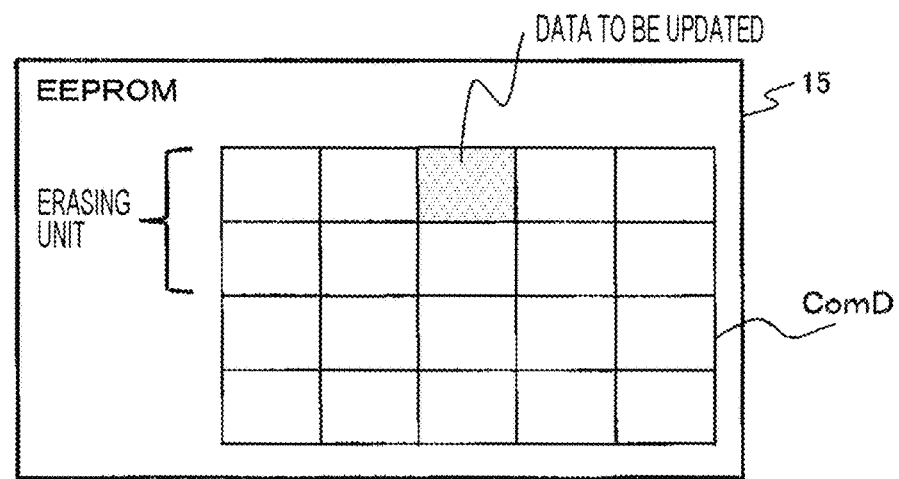
FIG. 9A is a diagram illustrating the second embodiment of the present invention and illustrating an update target in a case where common accompanying data is stored in an EEPROM.
Figure 9B:
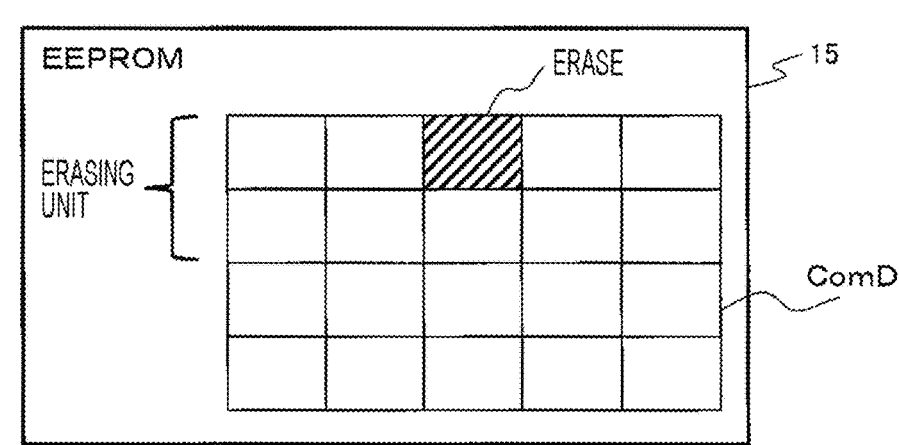
FIG. 9B is a diagram illustrating the second embodiment of the present invention and illustrating an erasing range in a case where the common accompanying data is stored in the EEPROM.
Figure 9C:
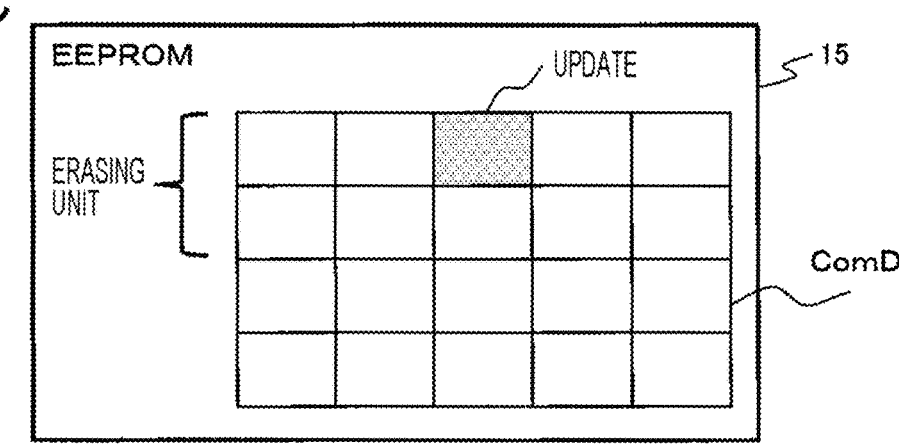
FIG. 9C is a diagram illustrating the second embodiment of the present invention and illustrating a state after update in a case where the common accompanying data is stored in the EEPROM.

FIGS. 8A to 8C and FIGS. 9A to 9C schematically illustrate rewriting processing in a case that the common storage area ComD in which the common accompanying data 32 is stored is in the flash memory 16 and a case that the common storage area ComD is in an EEPROM (including a simulated EEPROM). FIG. 8A is a diagram illustrating an update target in a case where the common storage area ComD is set in the flash memory 16, FIG. 8B is a diagram illustrating an erasing range, and FIG. 8C is a diagram illustrating a state after update. FIG. 9A is a diagram illustrating an update target in a case where the common storage area ComD is set in the EEPROM 15, FIG. 9B is a diagram illustrating an erasing range, and FIG. 9C is a diagram illustrating a state after update.

As illustrated in FIG. 6, there is an advantage that it is possible to create a program that does not depend on the storage areas Pa and Pb by commonalizing data accompanying a control program (the common accompanying data 32). However, there is a problem that it takes time to update the common accompanying data 32 in the common storage area ComD on the flash memory 16.

As an example of the common accompanying data 32, there is data having relatively small data size (less than one byte) such as ON/OFF information of a function realized by a control program. However, as illustrated in FIGS. 8A to 8C, when the common accompanying data 32 on the flash memory 16 is updated, it is necessary to erase not only data to be updated but also a large amount of peripheral data of the data to be updated, and then write the data to be updated and restore the erased data.

This is because erasing can be performed only in block units (sector units) since units of erasing (writing) are not bit units due to a characteristic of the flash memory 16.

Therefore, even if data to be updated is very small like the common accompanying data 32, time required for update increases because the erasing units are large due to the characteristic of the flash memory 16.

In view of the above, as illustrated in FIGS. 9A to 9C and 10, the above problem can be solved by setting the EEPROM 15 (including a simulated EEPROM) as a storage destination (the common storage area ComD) of the common accompanying data 32.

Figure 10:
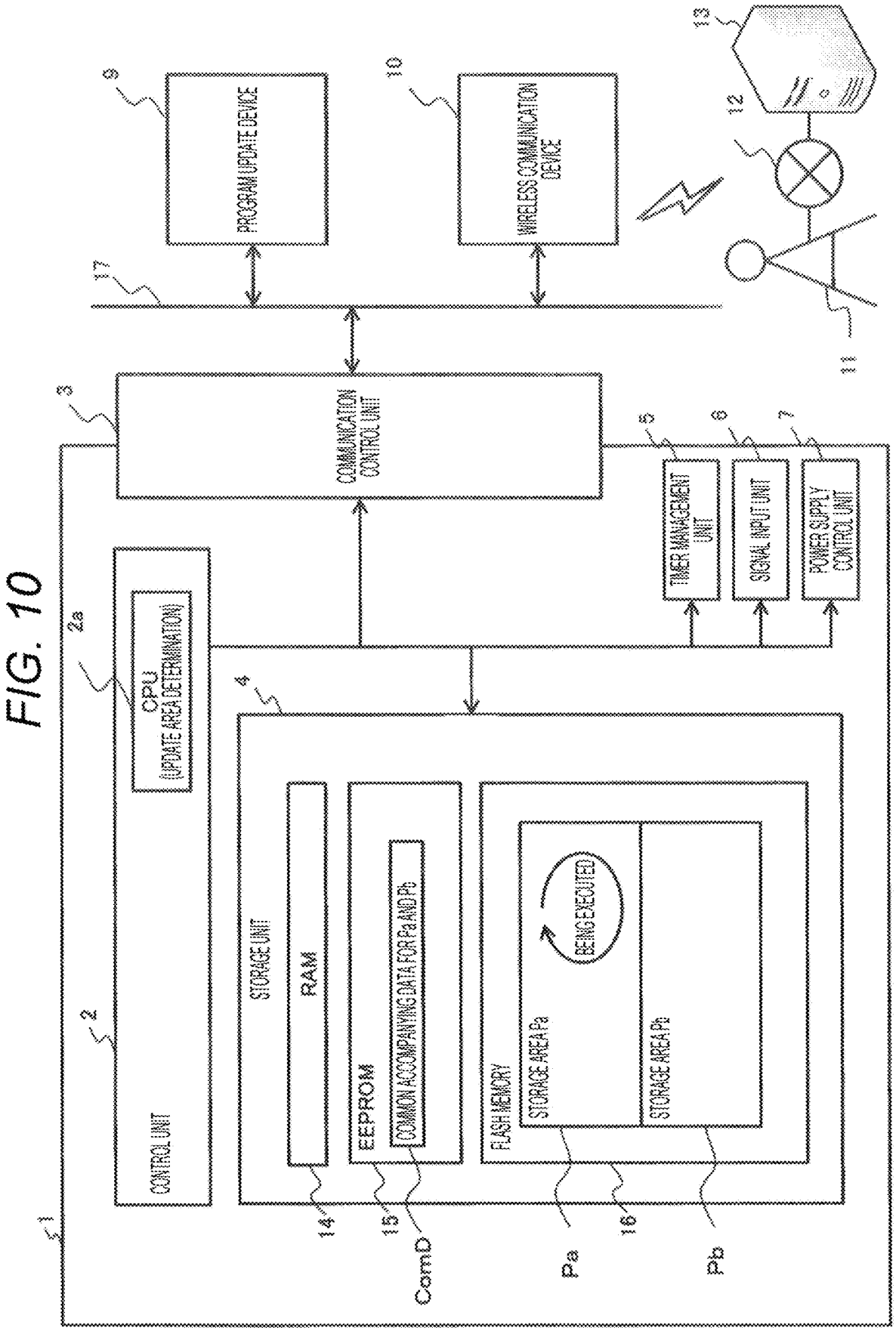
FIG. 10 is a functional block diagram illustrating the second embodiment of the present invention and illustrating an overall configuration of the program update system including the arithmetic processing device.

FIG. 10 is a block diagram illustrating an example of the arithmetic processing device 1 of the second embodiment. The arithmetic processing device 1 of the second embodiment sets the common storage area ComD for storing the common accompanying data 32 in the EEPROM 15 of the storage unit 4. The other configurations are the same as those of the first embodiment.

As illustrated in FIGS. 9A to 9C, in the EEPROM 15, erasing can be performed in bit units (or in byte units) as in the conventional example, so that the common accompanying data 32 to be updated can be updated in a pinpoint manner (in byte units), and the time required for the update can be shortened.

Further, in a simulated EEPROM which has been widely employed in recent years, a similar effect can be obtained because the erasing units are small as in the EEPROM 15.

For the above reason, the time required for erasing and rewriting can be shortened in the case of storing data in the EEPROM 15 than in the case of storing data in the flash memory 16.

Third Embodiment

The present embodiment reduces a use amount of the EEPROM 15 in the second embodiment.

A rollback function employed in a case where there are the storage areas Pa and Pb for storing two executable programs will be described. The rollback function is a function of returning a state to a state of a next point (control program and accompanying data) where operation is performed normally before to attempt recovery when a failure occurs at the time of update of a control program.

Figure 11:
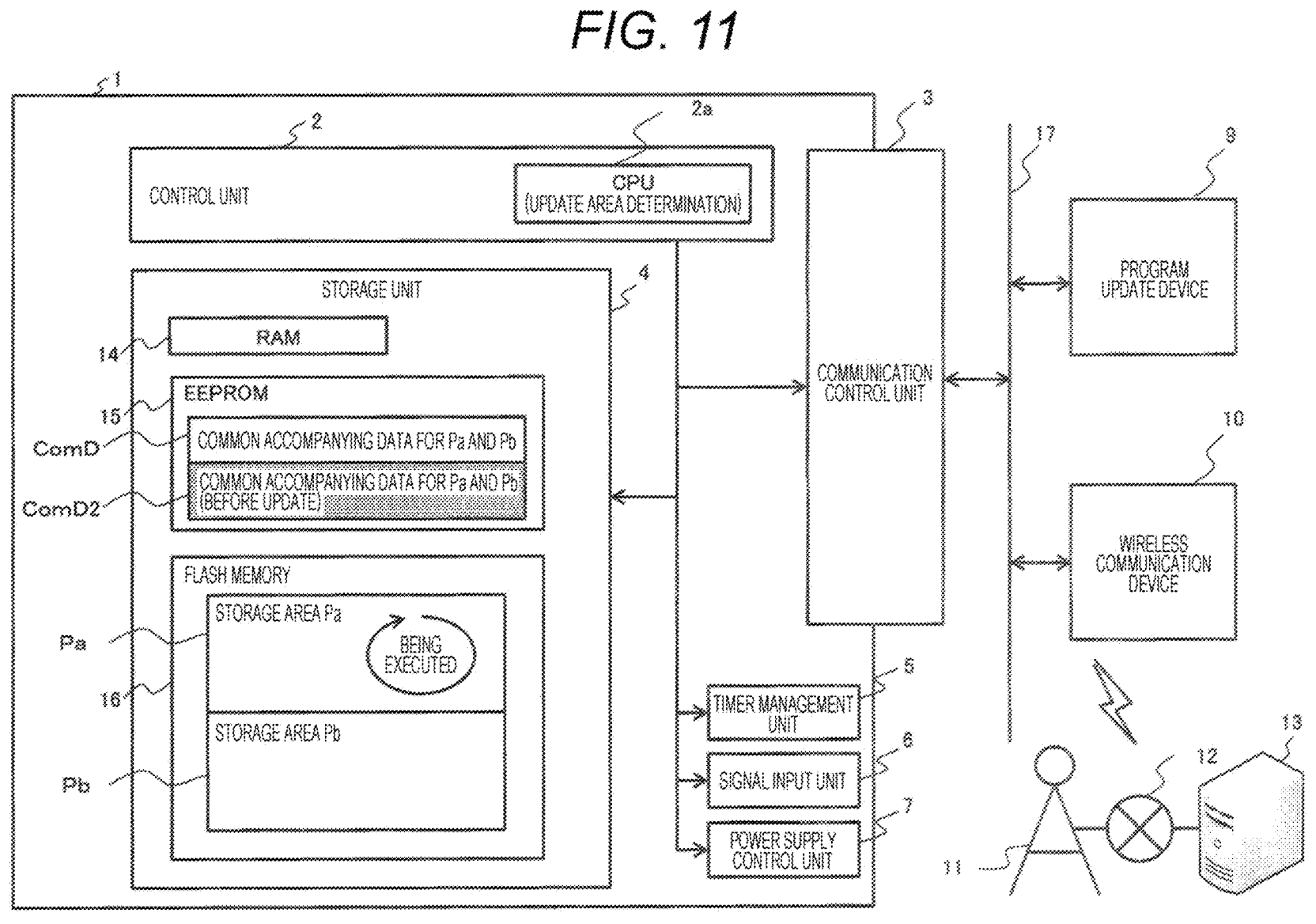

However, in order to realize the rollback function as illustrated in FIG. 11, it is necessary to prepare two areas (ComD and ComD2) for new and old common accompanying data, and thus a use amount of the EEPROM 15 becomes tight. Note that FIG. 11 is a block diagram of the arithmetic processing device 1 having a configuration in which the common accompanying data 32 before update is stored in the EEPROM 15.

Further, since the rollback function is an insurance against occurrence of a failure, the frequency of executing the rollback function is low, and it is inefficient to consume the capacity of the EEPROM 15.

In view of the above, to solve this problem, the present embodiment has a configuration of using the storage areas Pa and Pb, which are areas for storing a control program, as a storage destination of the common accompanying data 32 before update.

Figure 12:
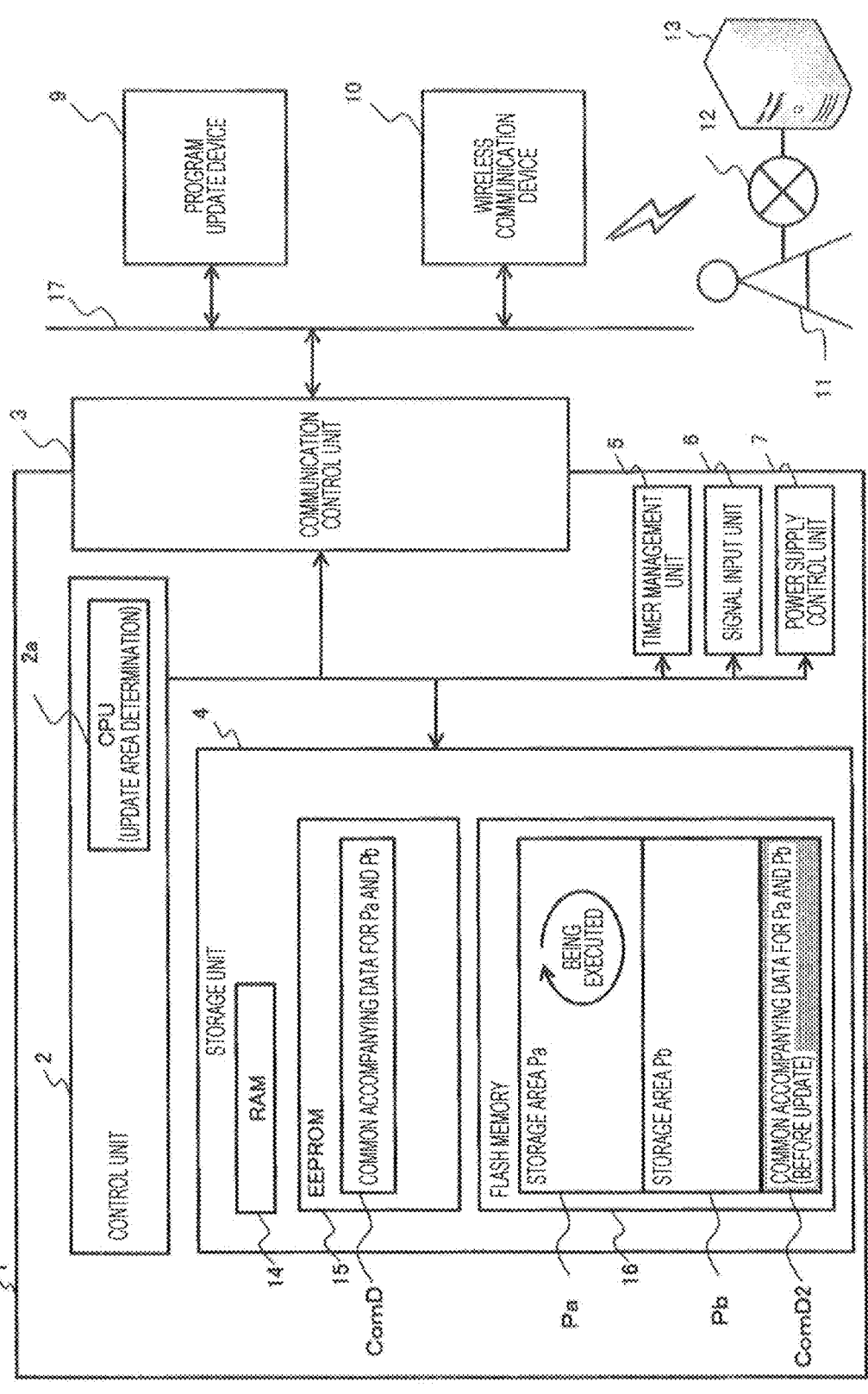
FIG. 12 is a functional block diagram illustrating the third embodiment of the present invention and illustrating an overall configuration of the program update system including the rollback function.

FIG. 12 is a block diagram of the arithmetic processing device 1 configured to store the common accompanying data 32 before update in the flash memory 16. In FIG. 12, the common storage area ComD2 for storing the common accompanying data 32 before update is set in the flash memory 16. The other configurations are the same as those of the second embodiment.

As illustrated in FIG. 12, a storage destination of the common storage area ComD2 in which the common accompanying data 32 before update is stored is the storage area Pb of a control program that is not currently executed (when an area of the control program that is not executed is Pa, the storage area Pa serves as the storage destination). In this manner, a control program to be rolled back and accompanying data can be managed together.

Figure 13:
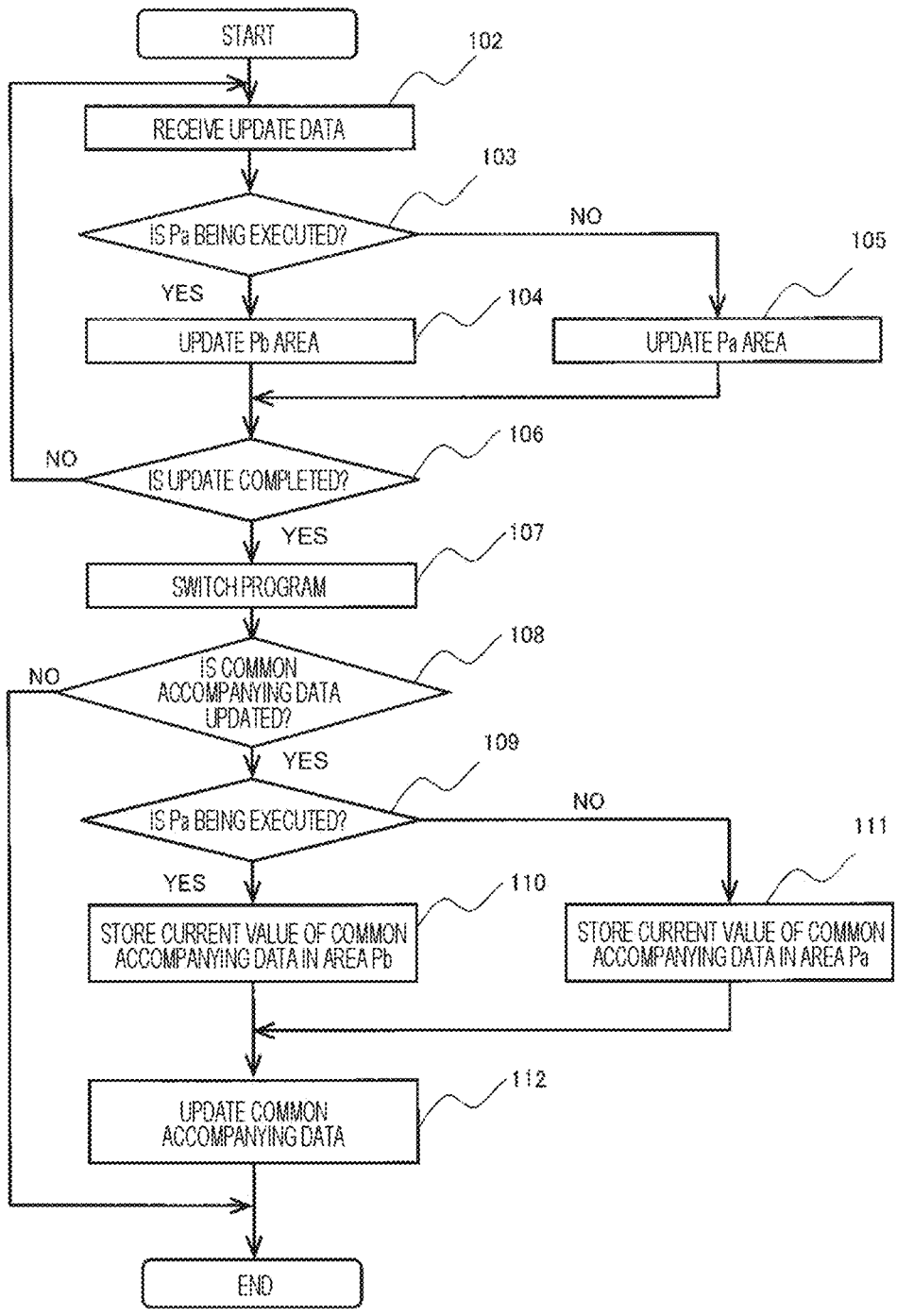
FIG. 13 is a flowchart illustrating the third embodiment of the present invention and illustrating an example of update processing.

Further, FIG. 13 is a flowchart illustrating an example of update processing of the common accompanying data 32 and storage processing of data before update. This processing is executed at predetermined intervals in the control unit 2 illustrated in FIG. 12, and after the update data 21 is received and after a control program is updated, and the common accompanying data 32 is updated. In the update of the common accompanying data 32, in a case where a control program of the storage area Pa is being executed, a value (common accompanying data 32) of the common storage area ComD before update is stored in the storage area Pb of a control program that is not being executed.

In description below, an example in which control programs of the storage areas Pa and Pb include an update function will be described. However, the control unit 2 may be caused to execute the update processing as an independent program. Further, hereinafter, the control unit 2 will be described as a processing subject. However, a control program read by the CPU 2a may be a processing subject. Note that, when the update processing ends, a control program executes predetermined processing (vehicle control or the like).

First, as shown in Step 102, the control unit 2 receives the update data 21 and determines whether or not a control program of the storage area Pa is being executed in Step 103. In a case where the control program of the storage area Pa is being executed, the processing proceeds to Step 104, and in a case where the control program of the storage area Pb is being executed, the processing proceeds to Step 105.

In Step 104, the control unit 2 erases the control program of the storage area Pb that is not being executed, and then performs writing to update the control program to the received control program. In Step 105, the control unit 2 erases the control program of the storage area Pa that is not being executed, and then performs writing to update the control program to the received control program.

In Step 106, the control unit 2 determines whether or not the update is completed. In a case where the update is completed, the processing proceeds to Step 107. In a case where the update is not completed, the processing returns to Step 102, and the above-described processing is repeated.

In Step 107, when the update of the control program is completed, the control unit 2 switches the control program to be executed. In the switching of the control program, if a predetermined condition (for example, the vehicle is stopped or in a parking state) is satisfied, the control program of the storage area Pa being currently executed is stopped, and the updated control program of the storage area Pb is started. In a case where the predetermined condition is not satisfied, the processing proceeds to Step 108.

Note that the switching of the control program may be requested not to the control program itself but to another program executed by the control unit 2.

After the switching of the control program is completed, as shown in Step 108, the control unit 2 determines whether or not the common accompanying data 32 is updated. If update is necessary, the processing proceeds to Step 109, and if update is unnecessary, the processing ends.

In Step 109, the control unit 2 determines whether or not the control program of the storage area Pa is being executed. In a case where the control program of the storage area Pa is being executed, the processing proceeds to Step 110, and in a case where the control program of the storage area Pb is being executed, the processing proceeds to Step 111.

In Step 110, a current value of the common accompanying data 32 is stored in the common storage area ComD2 in the storage area Pb that is not being executed by the control unit 2. In contrast, in Step 111, a current value of the common accompanying data 32 is stored in the common storage area ComD2 in the storage area Pa that is not being executed by the control unit 2.

The data to be stored by the control unit 2 may be all of the common accompanying data 32 or only data to be updated. After the storage is completed, the control unit updates the common accompanying data 32 in the common storage area ComD based on the received update data 21 as described in Step 112. Note that the update of the common accompanying data 32 in the common storage area ComD is preferably executed in a case where the control unit 2 determines that the predetermined condition is satisfied as described in Step 107.

By the above processing, update of the common accompanying data 32 and storage of data before update in the common storage area ComD2 can be achieved.

Figure 14:
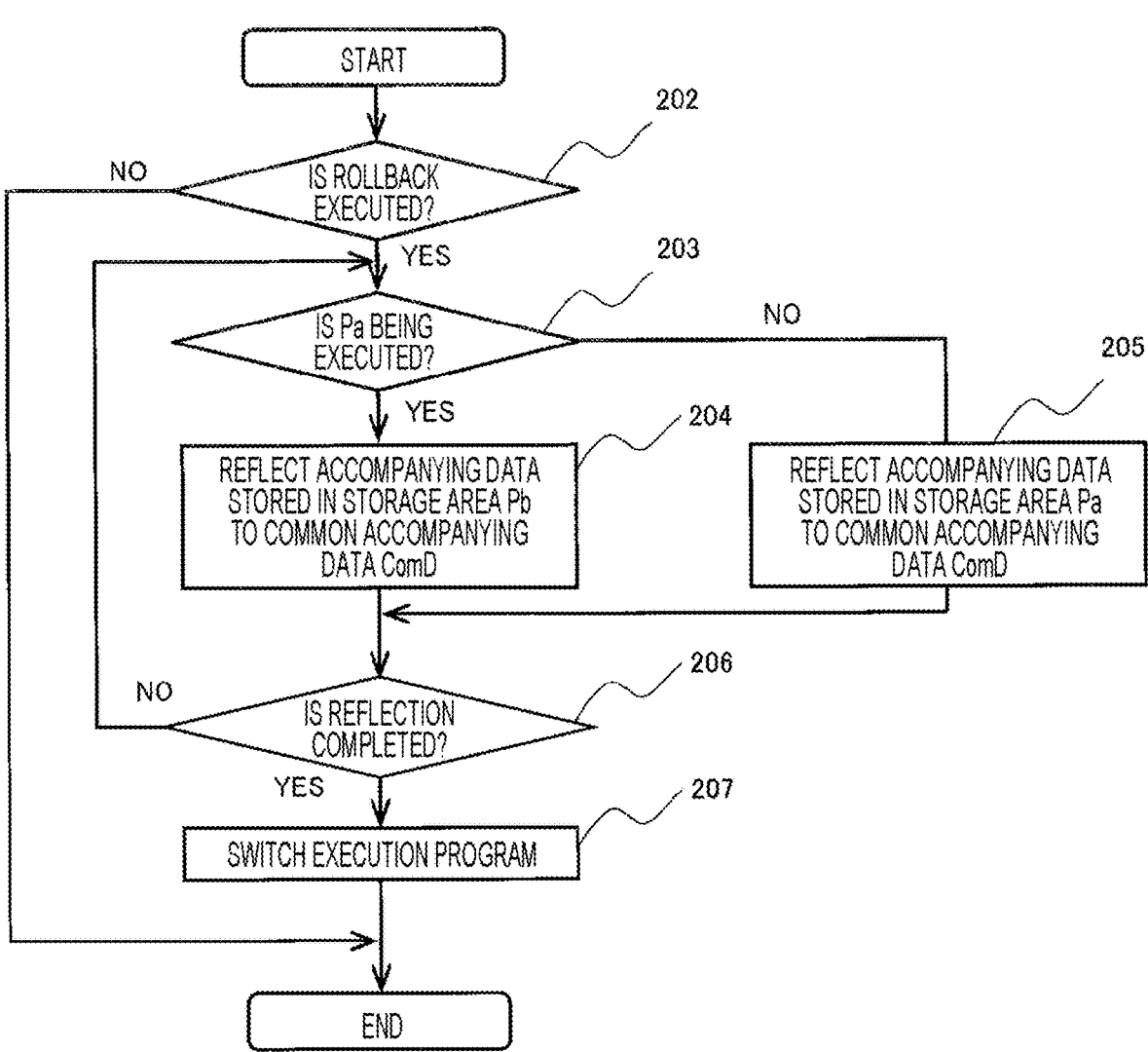
FIG. 14 is a flowchart illustrating the third embodiment of the present invention and illustrating an example of rollback processing.

Further, FIG. 14 illustrates a flowchart of processing at the time the rollback function is executed. In description below, an example in which control programs of the storage areas Pa and Pb include the rollback function will be described. However, the control unit 2 may be caused to execute rollback processing as an independent program. Further, hereinafter, the control unit 2 will be described as a processing subject. However, a control program read by the CPU 2a may be a processing subject. Note that, when the rollback processing ends, a control program executes predetermined processing (vehicle control or the like).

First, as described in Step 202, the control unit 2 determines whether or not rollback is necessary, and executes rollback only when an execution requirement of rollback is satisfied. The execution requirement of rollback may be, for example, when requested from another ECU, or when the ECU (arithmetic processing device 1) itself detects an error. In a case where the execution requirement is satisfied, the processing proceeds to Step 203, and in a case where the execution requirement is not satisfied, the processing ends.

Note that, when requested from another ECU, for example, in a case where a trouble occurs in a control program after update in another ECU, and rollback of another ECU or the control program is performed, rollback is also performed for a control program executed by the arithmetic processing device 1 regardless of the presence or absence of a failure in order to match the versions.

In Step 203, the control unit 2 determines whether or not the control program of the storage area Pa is being executed. In a case where the control program of the storage area Pa is being executed, the processing proceeds to Step 204, and in a case where the control program of the storage area Pb is being executed, the processing proceeds to Step 205.

In Step 204, the control unit 2 writes the common accompanying data 32 before update stored in the storage area Pb in the common storage area ComD to reflect the data. In Step 205, the control unit 2 writes the common accompanying data 32 before update stored in the storage area Pa in the common storage area ComD to reflect the data.

Then, in Step 206, after the reflection of the common accompanying data 32 before update is completed, the control unit 2 proceeds to Step 207 and switches the control program to be executed. Note that if the reflection of the common accompanying data 32 before update is not completed, the control unit 2 returns to Step 203 and repeats the above processing.

By the above processing, it is possible to reduce the capacity of the EEPROM 15 used for the common accompanying data 32 before update and to realize the rollback function.

Note that, after completion of the rollback, the control unit 2 may notify on a display screen or the like of a navigation device (not illustrated) connected to the arithmetic processing device 1 that the rollback is performed.

Note that the notification is not limited to an image, and may be voice or vibration.

Further, as an execution condition of the rollback, the rollback is desirably executed after a driver is notified of the start of rollback while the vehicle is stopped or parked, such as after an ignition key (not illustrated) of the vehicle is turned off or before the vehicle starts after the ignition key is turned on.

Further, when the update of a control program fails, the control unit 2 may inquire whether or not to execute update at the time of the next activation (key-on) on the navigation device or the like connected to the arithmetic processing device 1.

Note that, in the present embodiment, the example in which the common accompanying data 32 before update is stored in the storage areas Pa and Pb is described. However, the present invention is not limited to the configuration, and the common accompanying data 32 may be stored in a predetermined area of the flash memory 16.

CONCLUSION

As described above, the arithmetic processing device 1 or the vehicle control device of the above embodiment can have a configuration described below.

(1). A first rewritable storage unit (the flash memory 16 and the storage areas Pa and Pb) that stores two programs, a CPU (2a) that selects and executes one of the two programs, and a second rewritable storage unit (the common storage area ComD and the EEPROM 15) that stores common data (the common accompanying data 32) accompanying the two programs are included.

By the above configuration, on the premise that a control program and the common accompanying data 32 are updated, information (accompanying data) common to control programs is defined as the common accompanying data 32, and accompanying data that is not common is included in the control program, so that dependency between the accompanying data and the control program is eliminated. The common storage area ComD for storing the common accompanying data 32 is set in the flash memory 16, and non-common accompanying data is included in a control program, so that it is possible to create a control program that can be executed in the storage areas Pa and Pb without depending on the storage areas Pa and Pb, and, as indicated by the update data 21, it is not necessary to transfer extra information that is not used, so that it is possible to shorten the time required for the update.

(2). In the arithmetic processing device described in (1) above, the first rewritable storage unit (16) that stores the two programs includes a predetermined rewritable unit (block unit), and the second rewritable storage unit (ComD and 15) that stores common data accompanying the two programs includes a rewritable unit (byte unit) smaller than the predetermined rewritable unit of the first rewritable storage unit (16) that stores the two programs.

With the above configuration, data can be erased or rewritten (in byte units) in the EEPROM 15, so that the common accompanying data 32 to be updated can be updated in a pinpoint manner (in byte units), and time required for update can be shortened.

(3). In the arithmetic processing device described in (1) above, when the common data (32) accompanying the two programs is updated, the common data before update is stored as old data, and a storage destination of the old data is the second rewritable storage unit (ComD and 15) that stores the common data (32).

With the above configuration, as the common accompanying data 32 before update is stored in the common storage area ComD, it is possible to reproduce an execution environment of a program before update with the old data of the common storage area ComD when rollback to the program before update is performed.

(4). In the arithmetic processing device described in (1) above, when the common data (32) accompanying the two programs is updated, the common data before update is stored as old data, and a storage destination of the old data is the first rewritable storage unit (16).

With the above configuration, as the common accompanying data 32 before update is stored in the common storage area ComD of the flash memory 16, it is possible to reproduce an execution environment of a program before update with the old data of the common storage area ComD when rollback to the program before update is performed.

(5). The arithmetic processing device described in (1) above further includes a communication interface (the communication control unit 3) for exchanging data with an external system. The CPU (2a) receives common data accompanying the program that is not selected via the communication interface (3) to perform update.

With the above configuration, the update data 21 can be received from an external system to update the common accompanying data 32.

(6). In the arithmetic processing device described in (1) above, the common data includes information that affects execution of the program, and affects control of a vehicle.

With the above configuration, it is possible to use the common accompanying data 32 for updating a control program of an ECU or the like of a vehicle, and it is possible to ensure shortening of update time and execution of roll-back.

Note that the present invention is not limited to the above embodiment and includes a variety of variations.

For example, the above embodiments are described in detail for easier understanding of the present invention, and the present invention is not necessarily limited to the embodiments that include the entirety of the described configurations. Further, a part of a configuration of a certain embodiment can be replaced with a configuration of another embodiment, and a configuration of a certain embodiment can also be added to a configuration of another embodiment. Further, for a part of a configuration of each embodiment, any of addition of another configuration, deletion, and replacement can be applied alone or in combination.

Further, a part or all of the above configurations, functions, processing units, processing means, and the like may be obtained as hardware by way of, for example, designing such a part or all of them as an integrated circuit. The above configurations, functions, and the like may be obtained by software by which a processor interprets and executes programs that perform functions of them. Information, such as a program that realizes each function, a table, and a file, can be placed in recording devices, such as a memory, a hard disk, and a solid state drive (SSD), or recording media, such as an IC card, an SD card, and a DVD.

Further, a control line and an information line that are considered necessary for explanation are shown, and not all control lines or information lines necessary for a product are shown. In practice, almost all configurations may be considered to be connected mutually.

REFERENCE SIGNS LIST

1 arithmetic processing device
2 control unit
2a CPU
3 communication control unit
4 storage unit
14 RAM
15 EEPROM
16 flash memory
21 update data
32 common accompanying data
Pa storage area
Pb storage area
ComD common storage area
ComD2 common storage area

The invention claimed is:

1. An arithmetic processing device for a vehicle, the device comprising:
a first memory device that stores two programs and non-common data that is not common to the two programs, the two programs including a first program and a second program;

a CPU that selects the first program based on a relative update timing of the two programs, and executes the first program;
a second memory device that stores common data accompanying the two programs, the second memory device including a rewritable storage block addressable in byte or bit units, wherein the rewritable storage block of the second memory device is smaller than a rewritable storage block of the first memory device,
wherein the non-common data and the common data are stored separately in the first memory device and the second memory device, respectively, and
wherein the CPU is configured to:
update the second program;
reflect a portion of the non-common data that is associated with the second program to the common data; and
execute the second program, in response to completion of updating the second program, based on whether a predetermined condition associated with operation of the vehicle is satisfied.

2. The arithmetic processing device according to claim 1, wherein the rewritable storage block of the first memory device stores the two programs, and wherein an update timing of the first program is later than an update timing of the second program.

3. The arithmetic processing device according to claim 1, wherein when the common data accompanying the two programs is updated, the common data before update is stored as old data, and a storage destination of the old data is the second memory device that stores the common data.

4. The arithmetic processing device according to claim 1, wherein when the common data accompanying the two programs is updated, the common data before update is stored as old data, and a storage destination of the old data is the first memory device.

5. The arithmetic processing device according to claim 1, further comprising:
a communication interface for exchanging data with an external system,
wherein the CPU receives common data accompanying a program, the program not selected via the communication interface.

6. A vehicle control device including the arithmetic processing device according to claim 1, wherein the common data includes information that affects execution of one of the two programs, and affects control of the vehicle.

7. An update method for updating a program of a CPU and a main storage by an arithmetic processing device for a vehicle, the update method comprising:
storing, by the CPU, two programs and non-common data that is not common to the two programs in a first memory device, the two programs including a first program and a second program;
storing, by the CPU, common data accompanying the two programs in a second memory device including a rewritable storage block addressable in byte or bit units, wherein the rewritable storage block of the second memory device is smaller than a rewritable storage block of the first memory device; and
selecting, by the CPU, the first program based on a relative update timing of the two programs, and executing the first program;
updating, by the CPU, the second program;
reflecting, by the CPU, a portion of the non-common data that is associated with the second program to the common data; and executing, by the CPU, the second program, in response to completion of updating the second program one of the two programs, based on whether a predetermined condition associated with operation of the vehicle is satisfied, wherein the non-common data and the common data are stored separately in the first memory device and the second memory device, respectively.

8. The update method according to claim 7, wherein the rewritable storage block of the first memory device stores the two programs.

9. The update method according to claim 7, further comprising updating, by the CPU, the common data accompanying the two programs, the updating including storing the common data before update as old data in the second memory device that stores the common data.

10. The update method according to claim 7, further comprising updating, by the CPU, the common data accompanying the two programs, the updating including storing the common data before update as old data in the first memory device when the common data accompanying the two programs is updated.

11. The update method according to claim 7, further comprising:

exchanging, by the CPU, data with an external system through a communication interface; and updating, by the CPU, the common data accompanying the two programs, the updating including receiving common data accompanying a program that is not selected via the communication interface, wherein the program is one of the two programs.

12. The update method according to claim 7, wherein the common data includes information that affects execution of one of the two programs, and affects control of the vehicle.

* * * * *